United States Patent
Zhang (10) Patent No.: US 10,917,515 B2
(45) Date of Patent: Feb. 9, 2021

(54) METHOD FOR SWITCHING APPLICATIONS IN SPLIT SCREEN MODE, COMPUTER DEVICE AND COMPUTER-READABLE STORAGE MEDIUM

(71) Applicant: GUANGDONG OPPO MOBILE TELECOMMUNICATIONS CORP., LTD., Guangdong (CN)

(72) Inventor: Weichao Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/625,968

(22) PCT Filed: May 30, 2018

(86) PCT No.: PCT/CN2018/089020
§ 371 (c)(1),
(2) Date: Dec. 23, 2019

(87) PCT Pub. No.: WO2019/015404
PCT Pub. Date: Jan. 24, 2019

(65) Prior Publication Data
US 2020/0177726 A1  Jun. 4, 2020

(30) Foreign Application Priority Data

Jul. 20, 2017 (CN) .......................... 2017 1 0594360

(51) Int. Cl.
*G06F 3/048* (2013.01)
*H04M 1/725* (2021.01)

(52) U.S. Cl.
CPC .... *H04M 1/72583* (2013.01); *H04M 2201/42* (2013.01)

(58) Field of Classification Search
None
See application file for complete search history.

(56) References Cited

U.S. PATENT DOCUMENTS

| 2014/0075394 | A1 | 3/2014 | Nawle et al. |
| 2014/0351748 | A1* | 11/2014 | Xia ............... G06F 3/0481 715/798 |
| 2015/0067588 | A1 | 3/2015 | Shim et al. |

FOREIGN PATENT DOCUMENTS

| CN | 103324435 | 9/2013 |
| CN | 103455249 | 12/2013 |

(Continued)

OTHER PUBLICATIONS

WIPO, ISR for PCT/CN2018/089020, dated Sep. 7, 2018.
(Continued)

*Primary Examiner* — William C Trapanese
(74) *Attorney, Agent, or Firm* — Hodgson Russ LLP (57) ABSTRACT

A method, device for switching applications in the split screen mode, and a related device are provided. The method for switching applications in the split screen mode includes: a first selection instruction is received when the split screen mode of a terminal screen is activated by showing a number of display areas, the first selection instruction being configured to select a target display area from the display areas; one or more applications to be switched in the target display area is displayed in response to a receiving of a switching instruction of applications; a second selection instruction is received, the second selection instruction being configured to select a target application from the one or more applications to be switched; and an application displayed in the target display area is switched to the target application.

20 Claims, 7 Drawing Sheets

(56) References Cited

FOREIGN PATENT DOCUMENTS

| CN | 104133610 | 11/2014 |
|----|-----------|---------|
| CN | 104503700 | 4/2015 |
| CN | 105867815 | 8/2016 |
| CN | 106201319 | 12/2016 |
| CN | 106484220 | 3/2017 |
| CN | 106598529 | 4/2017 |
| CN | 107256129 | 10/2017 |
| EP | 3046018 | 7/2016 |

OTHER PUBLICATIONS

SIPO, First Office Action for CN Application No. 201710594360.2. dated May 5, 2019.
SIPO, Second Office Action for CN Application No. 201710594360. 2, dated Sep. 17, 2019.
EPO, Extended European Search Report for EP Application No. 18835264.5, dated Jun. 25, 2020.

\* cited by examiner

METHOD FOR SWITCHING APPLICATIONS IN SPLIT SCREEN MODE, COMPUTER DEVICE AND COMPUTER-READABLE STORAGE MEDIUM

CROSS-REFERENCE TO RELATED APPLICATIONS

This application is a U.S. national phase application of International Application No. PCT/CN2018/089020, filed May 30, 2018, which claims priority to Chinese Patent Application No. 201710594360.2, filed Jul. 20, 2017, the entire disclosures of which are incorporated herein by reference.

TECHNICAL FIELD

The present disclosure relates to the field of mobile terminal technologies, and in particular, to a method, a device and related device for switching applications in the split screen mode.

BACKGROUND

With the rapid development of technology, smart mobile terminals are becoming more and more popular in our lives, which greatly facilitates our life, entertainment and learning. More and more things can be done on mobile terminals. There are more and more functional requirements for all aspects of mobile terminals. In order to facilitate people to browse or process multiple applications on a mobile terminal at the same time, there are various ways to divide the screen of the mobile terminal, and each of the divided screen areas displays different applications to meet the needs of the user.

SUMMARY

The embodiment of the present disclosure provides a method, an apparatus, and a related device for switching applications in the split screen mode, which can switch applications in a split screen area simply.

A method for switching applications in the split screen mode, including:

Receiving a first selection instruction configured to select a target display area from a number of display areas, when the split screen mode of a terminal screen is activated by showing a number of display areas;

Displaying one or more applications to be switched in the target display area in response to a receiving of a switching instruction of applications;

Receiving a second selection instruction configured to select a target application from the one or more applications to be switched; and Switching an application displayed in the target display area to the target application.

A device for switching applications in a split screen mode, including:

A first instruction receiving module, configured to receive a first selection instruction when the split screen mode of a terminal screen is activated by showing a number of display areas, the first selection instruction being configured to select a target display area from the plurality of display areas;

A display module, configured to display one or more applications to be switched in the target display area in response to a receiving a switching instruction;

A second instruction receiving module, configured to receive a second selection instruction configured to select a target application among the one or more applications to be switched; and A switching module, configured to switch an application displayed in the target display area to the target application.

A computer readable storage medium having stored thereon a computer program, the computer program being executed by a processor to implement the following steps:

Receiving a first selection instruction configured to select a target display area from a number of display areas, when the split screen mode of a terminal screen is activated by showing a number of display areas;

Displaying one or more applications to be switched in the target display area in response to a receiving of a switching instruction of applications;

Receiving a second selection instruction configured to select a target application from the one or more applications to be switched; and Switching an application displayed in the target display area to the target application.

A computer device comprising a memory, a processor and a computer program stored on the memory and operable on the processor, the processor executing the program to implement the following steps:

Receiving a first selection instruction configured to select a target display area from a number of display areas, when the split screen mode of a terminal screen is activated by showing a number of display areas;

Displaying one or more applications to be switched in the target display area in response to a receiving of a switching instruction of applications;

Receiving a second selection instruction configured to select a target application from the one or more applications to be switched; and Switching an application displayed in the target display area to the target application.

BRIEF DESCRIPTION OF THE DRAWINGS

In order to more clearly illustrate the technical solutions of the embodiments of the present disclosure, the drawings used in the description of the embodiments will be briefly described below. The drawings in the following description are only some embodiments of the present disclosure, which are common in the art. For the skilled person, other drawings can be obtained from these drawings without any creative work.

DETAILED DESCRIPTION OF THE EMBODIMENTS

In order to make the objects, technical solutions, and advantages of the present disclosure more comprehensible, the present disclosure will be further described in detail below with reference to the accompanying drawings and embodiments. It is understood that the specific embodiments described herein are merely illustrative of the application and are not intended to be limiting.

Figure 1:
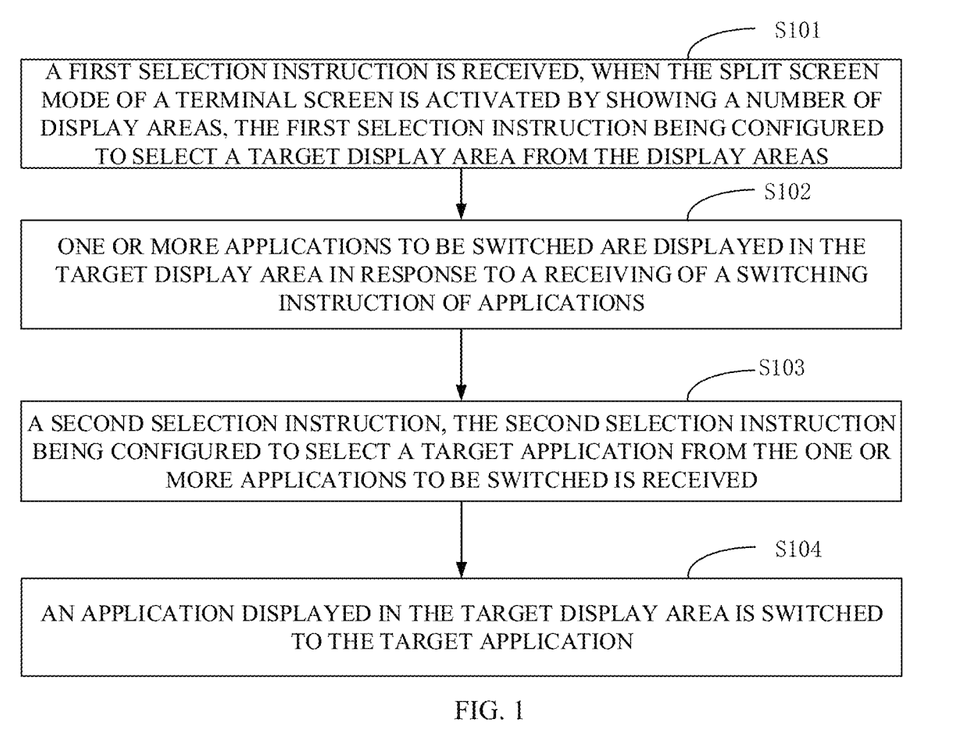
FIG. 1 is a flowchart of a method for switching applications in the split screen mode according to an embodiment of the present disclosure.

FIG. 1 is a flowchart of a method for switching applications in the split screen mode according to an embodiment of the present disclosure. A method for switching applications in the split screen mode according to an embodiment of the present disclosure is described in detail below with reference to FIG. 1. As shown in FIG. 1, the method includes the following steps: step 101, step 102, step 103, and step 104.

Step 101: a first selection instruction is received, when the split screen mode of a terminal screen is activated by showing a number of display areas, the first selection instruction being configured to select a target display area from the display areas;

According to an example of the embodiment, the quantity the plurality of display areas displayed in the terminal screen in the split screen mode may be N, in which N≥2 and N is an integer, and further, each of the display areas may have the same size or not. Furthermore, a dividing line between two different display areas may be a straight line, a wavy line, or an irregular line drawn by a user.

Further, when the value of N is 2, the terminal screen includes two display areas. In this case, the two display areas can be divided into a top screen and a bottom screen side-by-side.

The first selection instruction is generally input by the user, and the first selection instruction may be a touch operation applied on the terminal screen, or may be a voice instruction.

Step 102: one or more applications to be switched are displayed in the target display area in response to a receiving of a switching instruction of applications.

Further, in this step, all of the applications to be switched are displayed in the target display area, or only some of the applications to be switched are be displayed. When only some of the applications to be switched are displayed, the quantity of the displayed applications to be switched may be determined according to a threshold. For example, the threshold is 4, when the total of the applications to be switched is less than or equal to 4, all of the applications to be switched may be displayed; otherwise, the maximum quantity of the displayed application to be switched is 4.

The applications to be switched may be displayed by an icon of the application itself, or by a name of the application, or may by the name and icon of the application both. When the application to be switched is running, a running interface of the application to be switched may be displayed.

The application displayed by icon or name thereof may have not been accessed until selected to be the target application. The application displayed by running interface thereof may have been visited or used before selected to be the target application and may be running in the background.

According to an example of the embodiment, the switching instruction may be a preset single click in the target display area, or may be a preset double-click in the target display area, or may be a preset long-pressing on the target display area. The long pressing can be judged by whether a pressing time exceeds a preset time period value. For example, the preset time period value is 3 seconds, when the pressing time exceeds 3 seconds, the pressing is judged to be the long-pressing. In other embodiments, a message display area may be popped up for the user to select whether to switch applications after a touch operation is applied on the target display area, and then a switching will be operated or not according to the user's selection.

The application to be switched may be an application whose display layout has been adjusted. The adjusting includes scaling a running interface of the application to be switched to adapt to the size of the target display area. And furthermore, an identification of the adjusted application to be switched may be stored in a list of applications including all applications to be switchable.

Step 103: a second selection instruction, the second selection instruction being configured to select a target application from the one or more applications to be switched is received.

According to an example of the embodiment, the second selection instruction may be a touch instruction input by the user for selecting the target application. The touch instruction may be a single click or double-click or a long-pressing or a hard press with a pressure exceeding a preset threshold.

Step 104: an application displayed in the target display area is switched to the target application.

The switching in the step is, for example, a replacement. The effect of the replacement may be to replace an interface of the current application with an interface of the target application, that is, replace a running interface of the application displayed in the target display area with a running interface of the target application.

According to an example of the embodiment, after the step 104, the method for switching applications in the split screen mode further includes: the first selection instruction is received again, the terminal screen is divided into a number of display areas, the first selection instruction is used to select the target display area from the display areas, and the steps 101 to 104 are performed in cycle.

In this embodiment, by selecting a target display area and a target application, it is simple for the user to select the target application to be displayed in the target display area according to an actual need.

Figure 2:
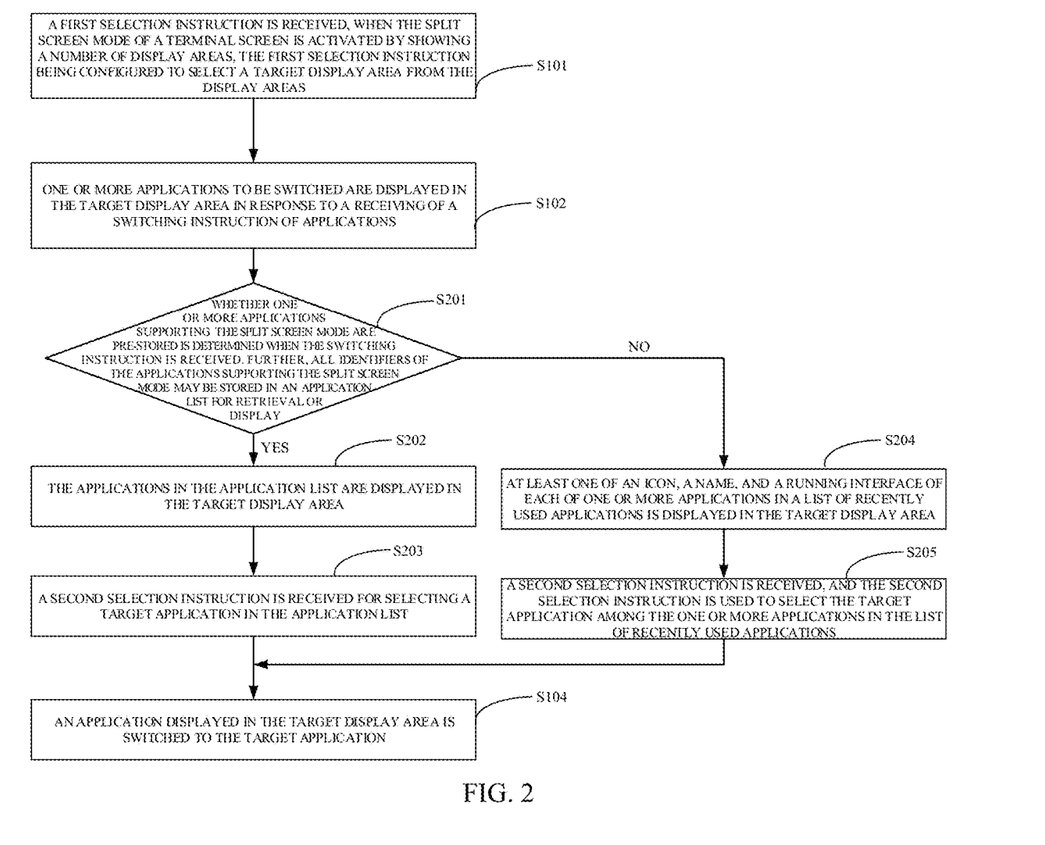
FIG. 2 is a flowchart of a method for switching applications in the split screen mode according to another embodiment of the present disclosure.

FIG. 2 is a flowchart of a method for switching applications in the split screen mode according to another embodiment of the present disclosure. A method for switching applications in the split screen mode according to an embodiment of the present disclosure is described in detail below. As shown in FIG. 2, the method includes the steps of: step 101, step 102, and step 104, and further includes: at least one of an icon, a name, and a running interface of each of one or more applications supporting the split screen mode in the target display area is displayed when the one or more applications supporting the split screen mode are pre-stored, and the second selection instruction is used to select a target application from the one or more applications supporting the split screen mode displayed. The method for switching an application includes the following steps 201 to 205.

Step 201: whether one or more applications supporting the split screen mode are pre-stored is determined when the switching instruction is received. Further, all identifiers of the applications supporting the split screen mode may be stored in an application list for retrieval or display. If yes, proceed with a step 202; otherwise, proceed with a step 204. The applications listed in the application list may be displayed by names or other identifiers capable of representing the applications. Further, the applications stored in the application list are applications having been adjusted.

Step 202: the applications in the application list are displayed in the target display area, and then proceed with a step 203. The applications may be displayed by icons of the applications themselves, or by names of the applications, or by names and icons of the applications both. When one of the applications to be switched is running in the background, a running interface of the application to be switched may be displayed.

Step 203: a second selection instruction is received for selecting a target application in the application list, and then a step 104 is proceeded with.

Step 204: at least one of an icon, a name, and a running interface of each of one or more applications in a list of recently used applications is displayed in the target display area, and then a step 205 is proceeded with. The display manner of the one or more applications includes, but is not limited to, the icons of the applications, the names of the applications, or both of the names and icons of the applications. According to a use scenario of this step, as shown in the bottom screen of FIG. 4, when the one or more applications in the list of recently used applications are running, a running interface of the one or more applications may be displayed.

Step 205: a second selection instruction is received, and the second selection instruction is used to select the target application among the one or more applications in the list of recently used applications.

Figure 4:
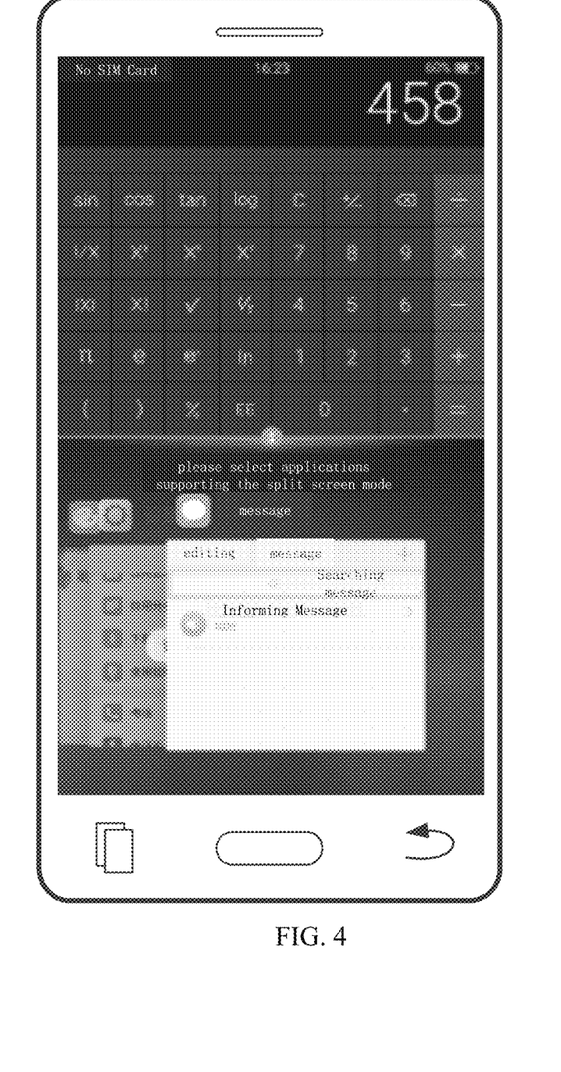
FIG. 4 is a schematic diagram of an interface of a usage scenario according to an embodiment of the present disclosure.

The step 104 further includes: when the target application is an application supporting the split screen mode, an application displayed in the target display area is switched to the target application; otherwise, the split screen mode is exited, and the target application is displayed in a full-screen mode. According to a usage scenario of this step, as shown in the bottom screen of FIG. 4, the second selection instruction is a selection instruction applied in the divided screen by the user. Take displaying the running interface of each of the applications as an example, as shown in FIG. 4, the user swipes right or left to switch the applications displayed in the list of recently used applications. When a touch instruction corresponding to a message application is received, the current application in the target display area is switched to the message application.

According to an example of the embodiment, after the step 202, the method for switching the application in the split screen mode further includes the following steps (1) to (3).

(1) when the one or more applications supporting the split screen mode include a number of applications running in the background, a latest time being visited of each of the one or more applications running in the background is obtained;

(2) the plurality of applications running in the background are arranged in an order of the latest time being visited from the most recent to the earliest to obtain a first order; and (3) the at least one of the icons, the name, and the running interface of the applications running in the background is displayed in the target display area, according to the first order.

Optionally, after arranged in the first order, the method for switching applications in the split screen mode further includes:

when the one or more applications supporting the split screen mode include one inactive application, the inactive application to be displayed is arranged after applications running in the background of the first order;

when the one or more applications supporting the split screen mode include a number of inactive applications, the number of times that each of the inactive applications being visited within a given period of time is obtained;

the inactive applications are sorted in a descending order of the number of the times to obtain a second order; and the inactive applications of the second order to be displayed are arranged after applications running in the background of the first order.

According to another example of the embodiment, the step 204 further includes the following steps (4) to (6):

(4) when the list of recently used applications include a number of applications running in the background, a latest time being visited of each of the applications running in the background is obtained;

(5) the applications running in the background is sorted in a third order, the third order being an order of the latest time being visited from the most recent to the earliest.

(6) the at least one of the icons, the name, and the running interface of applications running in the background is displayed in the target display area, according to the third order.

In the step (2), the first order being order of the latest time being visited from the most recent to the earliest means that the earlier the application being visited, the lower of the rank of the application to be displayed.

Referring to the sorted application shown in the bottom screen in FIG. 4, it can be seen that the message application is recently being visited.

In this embodiment, two ways of displaying the applications to be switched are provided. One is to provide an application list storing applications supporting the split screen mode for the user to select, and the other is to provide applications in the list of recently used applications for the user to select, which makes the terminal multifunctional. In addition, the embodiment also ranks the applications by their lasted time being visited. The recently lasted used application is ranked with priority for the user to select the application mostly used or recently used quickly, which complies with the user's habits and improves the user's experience.

According to another embodiment of the present disclosure, a method for switching applications in the split screen mode, including the steps 101 to 104, and before the step 104, the method for switching applications in the split screen mode also includes the following steps:

A split screen mode instruction to enter the split screen mode is received, and a current application in a first display area is displayed in the first display area;

The first selection instruction is used to select a second display area to be the target display area.

When the full screen mode is the desktop, the user needs to select the target application in each of the split screens, respectively.

Further, before the step of entering the split screen mode, the method further includes whether a switch of the split screen mode is turned on is detected, and if yes, a split screen mode instruction for entering the split screen mode can be received. The switch of the split screen mode may be displayed on the terminal screen and is also configured to receive the touch instruction. The switch of the split screen mode may be set on the same interface as the Bluetooth switch, the Wi-Fi (Wireless-Fidelity) switch, and the cellular mobile network switch.

According to an example of the embodiment, whether a received instruction is an split screen mode instruction for entering the split screen mode may be determined by a preset manner. FIG. 4 is a schematic diagram of a usage scenario interface according to an embodiment of the present disclosure, as shown in FIG. 4. For example, the terminal is set to enter the split screen mode via a long-pressing in the menu displayed in a lower-left corner of the screen, and the pressing is a long-pressing or not is judged by whether the pressing time exceeds a preset time period, for example, 3 seconds. When the user presses the menu for more than 3 seconds, the instruction for entering the split screen mode is received.

The step of displaying a current application in the first display area is displaying a running interface of the current application in the first display area. A usage scenario according to the embodiment is shown in FIG. 4. When the current application is a calculator application, when the split screen mode switch is turned on, the split screen mode instruction for entering the split screen mode is received, and the split screen mode is entered, the interface of the current application is displayed in the upper display area of the terminal screen.

The embodiment provides a method for entering the split screen mode, so that the user only needs to open the split screen mode switch and then input the split screen mode instruction to enter the split screen mode, which is convenient for the user to operate.

Further, the method for switching applications in the split screen mode further includes:

An instruction applied on a Home button is received while the terminal screen is in the split screen mode, exiting the split screen mode and displaying a desktop of the terminal screen.

Figure 3:
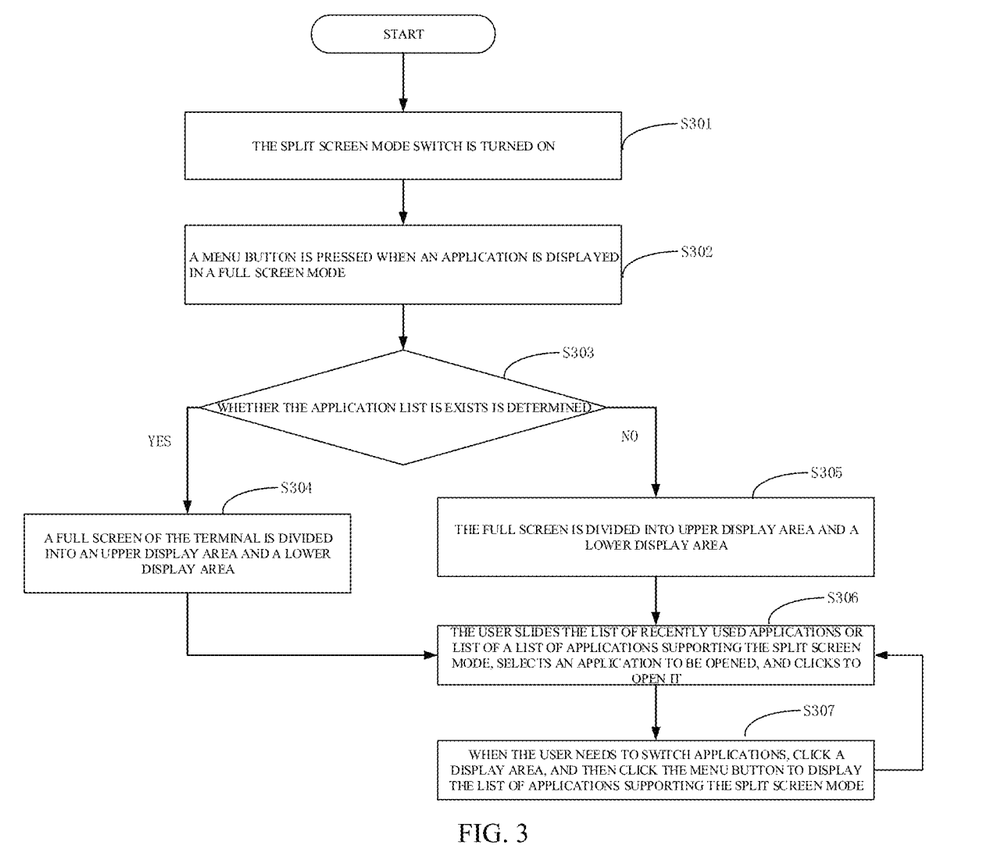
FIG. 3 is a flowchart of a usage scenario according to an embodiment of the present disclosure.

FIG. 3 is a flowchart of a usage scenario according to an embodiment of the present disclosure. A usage scenario of a method for switching applications in the split screen mode according to a corresponding embodiment of the present disclosure is described in detail below with reference to FIG. 3, FIG. 4 and FIG. 5. The following steps 301 to step 307 are included:

Step 301: the split screen mode switch is turned on. The split screen mode switch may be a virtual button switch, or the split screen mode switch may be set in the same interface as the Bluetooth switch or the Wi-Fi switch, so that the user can find the split screen mode switch easily.

Step 302: a menu button is pressed when an application is displayed in a full screen mode, the menu button may be in the lower-left corner as shown in FIG. 4, which triggers the split screen mode instruction to obtain a list of applications supporting the split screen mode.

Step 303: whether the application list is exists is determined. If yes, proceeding with a step 305. Otherwise, proceeding with a step 304.

Step 304: a full screen of the terminal is divided into an upper display area and a lower display area. The upper display area displays the application displayed in the full screen before, the lower display area displays a list of recently used applications, and then proceeding with a step 306. When the current application shown in FIG. 4 is a calculator application, the calculator application is displayed in upper display area.

Step 305, the full screen is divided into upper display area and a lower display area. The upper display area displays the application displayed in the full screen before, and the lower display area displays a list of applications supporting the split screen mode, and then proceed with a step 306. The application is displayed by the steps (1) to (3) or (4) to (6).

Figure 5:
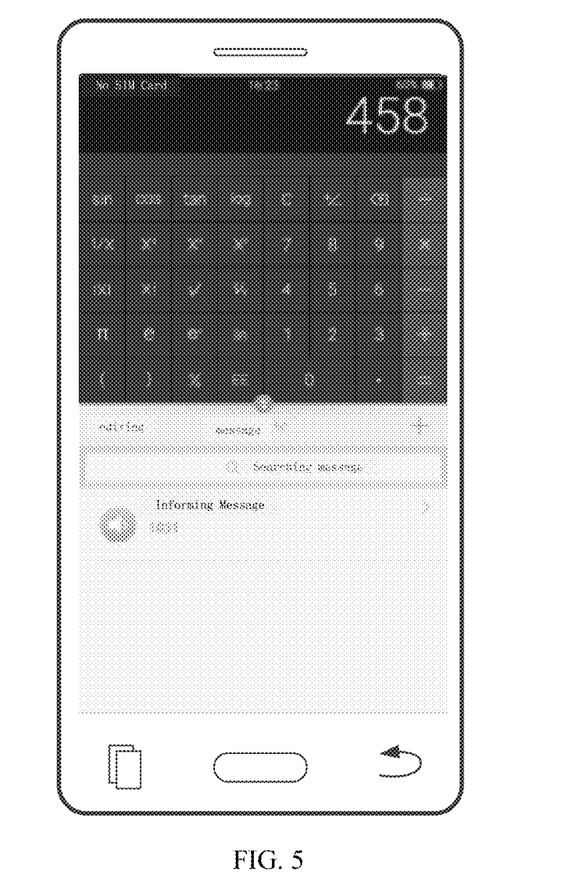
FIG. 5 is a schematic diagram of an interface of a usage scenario according to another embodiment of the present disclosure.

Step 306: the user slides the list of recently used applications or list of a list of applications supporting the split screen mode, selects an application to be opened, and clicks to open it. For example, the application selected by the user to be opened is the message application, thus the application interface displayed in the lower display area is switched to a running interface of the message application, as shown in FIG. 5.

Step 307: when the user needs to switch applications, click a display area, and then click the menu button to display the list of applications supporting the split screen mode. The step 306 or the step 307 is executed until the user stop switching applications, that is, the user does not need to input a switching instruction.

According to an example of the embodiment, the steps of the steps 101 to 307 are not used to limit the order of the steps in the embodiment, and the numbers of the steps are only for the purpose of making the steps refer to the labels of the steps. It is convenient to refer to the scope of the present disclosure as long as the order of execution of the various steps does not affect the logical relationship of the present embodiment.

The embodiment provides a method for switching application in the split screen mode. By selecting a target display area and a target application in a loop, the user can select the target display area and the target application as many times as possible based on the user's needs, so that the user can select again when a first selection is wrong or there is a new demand.

The steps in the method flowchart of the embodiment of the present disclosure are sequentially displayed in accordance with the indication of the arrow, but the steps are not necessarily performed in the order indicated by the arrow. Except as explicitly stated herein, the execution of these steps is not strictly limited, and may be performed in other orders. Moreover, at least some of the steps in the method flowchart of the embodiment of the present disclosure may include multiple sub-steps or multiple stages, which are not necessarily performed at the same time, but may be executed at different times. The order of execution is not necessarily performed sequentially but may be performed alternately or alternately with at least a portion of other steps or sub-steps or stages of other steps.

Figure 6:
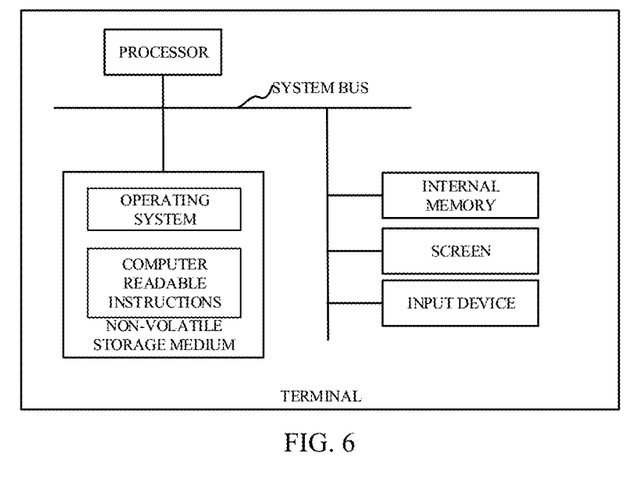
FIG. 6 is a schematic diagram of an internal structure of a terminal according to an embodiment of the present disclosure.

FIG. 6 is a schematic diagram of an internal structure of a terminal according to an embodiment of the present disclosure. As shown in FIG. 6, the terminal includes a processor connected through a system bus, a non-volatile storage medium, an internal memory and a network interface, and a sound collecting device, speakers, display and input devices. The non-volatile storage medium of the terminal stores an operating system and computer readable instructions. The computer readable instructions are executed by the processor to implement a method for switching applications in a split screen mode. The processor is used to provide computing and control capabilities to support the operation of the entire terminal. The internal memory in the terminal provides an environment for the operation of computer readable instructions in a non-volatile storage medium. The display screen of the terminal may be a liquid crystal display or an electronic ink display screen. The input device may be a touch layer covered on the display screen, or may be a button, a trackball or a touchpad provided on the terminal housing, or may be an external device, such as keyboard, trackpad or mouse. The terminal may be a mobile phone, a tablet or a personal digital assistant or a wearable device. A person skilled in the art can understand that the structure shown in FIG. 6 is only a block diagram of a part of the structure related to the solution of the present disclosure, and does not constitute a limitation on the terminal to which the solution of the present disclosure is applied. The specific terminal may include a ratio. More or fewer components are shown in the figures, or some components are combined, or have different component arrangements.

Figure 7:
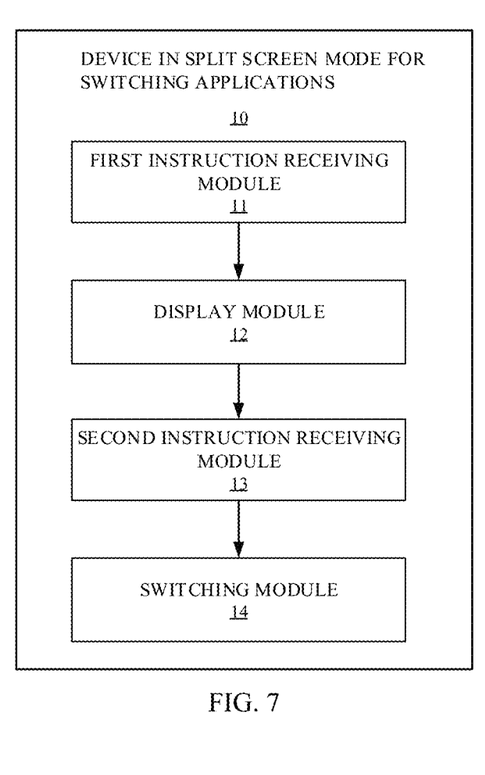
FIG. 7 is a structural block diagram of an apparatus for switching applications in the split screen mode according to an embodiment of the present disclosure.

FIG. 7 is a structural block diagram of an device for switching applications in the split screen mode according to an embodiment of the present disclosure. Hereinafter, an device for switching applications in the split screen mode according to an embodiment of the present disclosure, is described in detail. As shown in FIG. 7, the device 10 for switching applications in the split screen mode includes:

A first instruction receiving module 11, configured to receive a first selection instruction when the split screen model of the terminal screen is activated by showing a number of display areas, the first selection instruction being configured to select a target display area from the display areas;

A display module 12, configured to display one or more applications to be switched in the target display area in response to a receiving of a switching instruction of applications;

A second instruction receiving module 13, configured to receive a second selection instruction, the second selection instruction being configured to select a target application from the one or more applications to be switched; and A switching module 14, configured to switch an application displayed in the target display area to the target application.

According to an example of the embodiment,

The display module is further configured to display at least one of an icon, a name, and a running interface of each of one or more applications supporting the split screen mode in the target display area, the one or more applications supporting the split screen mode being pre-stored;

The second instruction receiving module is further configured to select a target application among the one or more applications supporting the split screen mode displayed. According to an example of the embodiment, the device 10 for switching applications in the split screen mode further includes:

A first time acquiring module, configured to obtain a latest time being visited of each of the applications running in the background, when the one or more applications supporting the split screen mode includes a number of applications running in the background; A sorting module, configured to sort the plurality of applications running in the background in an order of the latest time from the most recent to the earliest, to obtain a first order;

The display module is further configured to display the at least one of the icons, the name, and the running interface of the plurality of background running applications in the target display area, according to the first order.

Further, the device 10 for switching applications in the split screen mode further includes:

A first sorting unit, configured to: when the one or more applications supporting the split screen mode includes one inactive application, arrange the inactive application to be displayed after the background running applications of the first order;

The number obtaining unit is configured to obtain the number of times that each of the inactive applications being visited within a given period of time when the one or more applications supporting the split screen mode includes a number of inactive applications;

A second sorting unit, configured to sort the inactive applications in a descending order of the number of the times to obtain a second order;

And an arranging unit, configured to arrange the inactive applications of the second order to be displayed after the background running applications of the first order.

Further, when the application supporting the split screen switching is stored in the form of an application list, the application list stores identifiers of all applications supporting split screen switching, and the identifier of the application includes, but is not limited to, an application name, an icon, and the like.

When the application supporting the split screen mode is stored in the form of an application list, the display module is configured to display the application list pre-stored applications supporting split screen switching. The second instruction receiving module is specifically configured to receive a second selection instruction corresponding to the application in the application list.

Optionally, the display module is further configured to display at least one of an icon, a name, and a running interface of one or more applications in a list of recently used applications in the target display area;

The second selection instruction is configured to select the target application among the one or more applications in the list of recently used applications;

The switching module is further configured to switch to the target application from an application displayed in the target display area, otherwise, exiting the split screen mode, and displaying the target application in a full screen mode, when the target application is an application supporting the split screen mode;

A second time acquiring module, configured to obtain a latest time being visited of each of the applications running in the background, when the one or more applications supporting the split screen mode includes a number of applications running in the background;

The sorting module is further configured to: sort the running applications according to the latest late access time, to obtain a third order;

The display module 12 is further configured to display the at least one of the icons, the name, and the running interface of the background running applications in the target display area, according to the third order.

Further, the device 10 for switching applications in the split screen mode further includes:

A split screen module is configured to receive a split screen mode instruction to enter the split screen mode, and display a current application in a first display area; the first selection instruction is configured to select a second display area to be the target display area.

Further, the device 10 for switching applications in the split screen mode further includes:

A split screen exit module is configured to exit the split screen mode and displaying a desktop of the terminal screen in response to receive an instruction applied on a Home button while the terminal screen is in the split screen mode.

The division of each module in the device for switching applications in the split screen mode is for illustrative purposes only. In other embodiments, the device for switching applications in the split screen mode may be divided into different modules as needed to complete all or part of the functions of the device in the split screen mode.

It will be understood that the terms "first", "second" and the like, as used herein, may be used to describe various elements, but these elements are not limited by these terms. These terms are only used to distinguish one element from another. For example, the first instruction receiving module may be referred to as a second instruction receiving module without departing from the scope of the present disclosure, and similarly, the second instruction receiving module may be referred to as a first instruction receiving module. Both the first instruction receiving module and the second instruction receiving module are instruction receiving modules, but they are not the same instruction receiving module.

In this embodiment, by selecting a target display area and a target application, it is simple for the user to select the target application to be displayed in the target display area according to an actual need.

Each of the above-described devices in the application for switching applications in the split screen mode may be implemented in whole or in part by software, hardware, and combinations thereof. The above modules may be embedded in the hardware in the processor or in the memory in the server or may be stored in the memory in the server, so that the processor calls the corresponding operations of the above modules. As used in this application, the terms "component", "module" and "system" and the like are intended to mean a computer-related entity, which may be hardware, a combination of hardware and software, software, or software in execution. For example, a component can be, but is not limited to being, a process running on a processor, a processor, an object, an executable, a thread of execution, a program, and/or a computer. By way of illustration, both an application running on a server and a server can be a component. One or more components can reside within a process and/or executed thread, and the components can be located within one computer and/or distributed between two or more computers.

Figure 8:
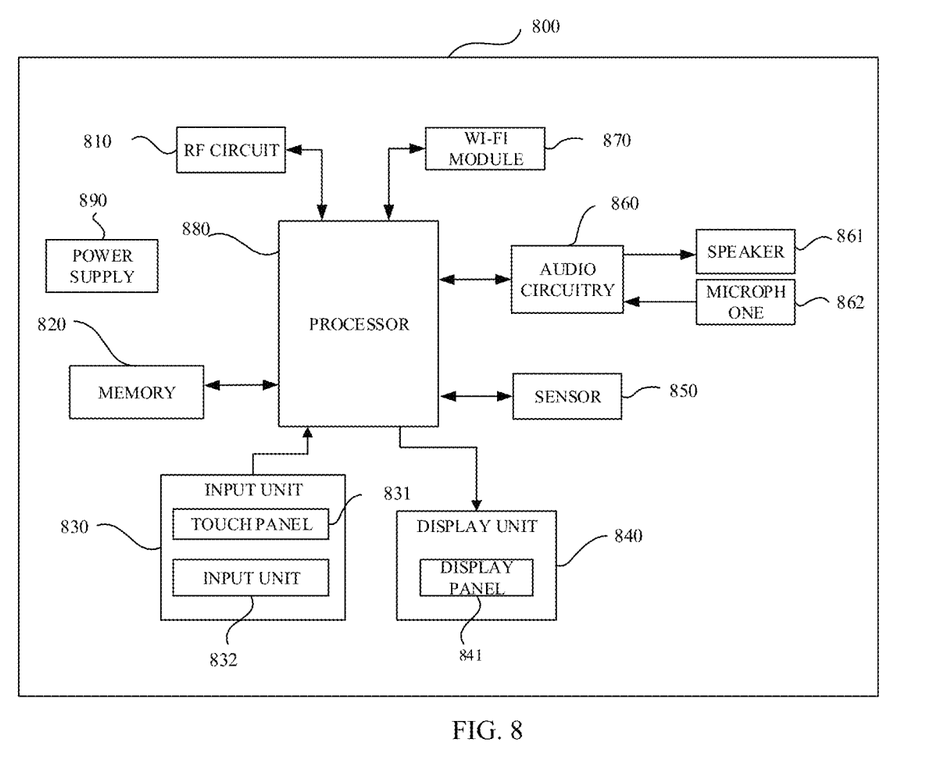
FIG. 8 is a block diagram showing the structure of a computer device in accordance with an embodiment of the present disclosure.

FIG. 8 is a structural block diagram of a computer device according to an embodiment of the present disclosure. As shown in FIG. 8, for the convenience of description, only parts related to the embodiments of the present disclosure are shown, and specific technical details not disclosed may be referred to the method of the embodiment. The computer device may be any terminal device including a mobile phone, a tablet computer, a PDA (Personal Digital Assistant), a POS (Point of Sales), a vehicle-mounted computer, a wearable device, and the like.

FIG. 8 is a block diagram showing a part of a structure of a mobile phone related to a computer device according to an embodiment of the present disclosure. Referring to FIG. 8, the mobile phone includes: a radio frequency (RF) circuit 810, a memory 820, an input unit 830, a display unit 840, a sensor 850, an audio circuit 860, a Wi-Fi module 870, a processor 880, and a power supply 890. It will be understood by those skilled in the art that the structure shown in FIG. 7 does not constitute a limitation, and may include more or less components than those illustrated, or some components may be combined, or different components may be arranged.

The RF circuit 810 can be used for receiving and transmitting information during the transmission or reception of information, and can receive and send the downlink information of the base station, and then send the uplink data to the base station. Generally, RF circuits include, but are not limited to, an antenna, at least one amplifier, a transceiver, a coupler, a Low Noise Amplifier (LNA), a duplexer, and the like. In addition, the RF circuitry 810 can also communicate with the network and other devices via wireless communication. The above wireless communication may use any communication standard or protocol, including but not limited to Global System of Mobile communication (GSM), General Packet Radio Service (GPRS), Code Division Multiple Access (Code Division), Multiple Access (CDMA), Wideband Code Division Multiple Access (WCDMA), Long Term Evolution (LTE), e-mail, Short Messaging Service (SMS), and the like.

The memory 820 can be used to store software programs and modules, and the processor 880 executes various functional applications and data processing of the mobile phone by running software programs and modules stored in the memory 820. The memory 820 may mainly include a program storage area and a data storage area, wherein the program storage area may store an operating system, an application required for at least one function (such as an application of a sound playing function, an application of an image playing function, etc.). The data storage area can store data (such as audio data, address book, etc.) created according to the use of the mobile phone. Moreover, the memory 820 can include high-speed random-access memory, and can also include non-volatile memory, such as at least one magnetic disk storage device, flash memory device, or other volatile solid-state storage device.

The input unit 830 can be configured to receive input numeric or character information and to generate key signal inputs related to user settings and function control of the handset 800. Specifically, the input unit 830 may include a touch panel 831 and other input devices 832. The touch panel 831, also referred to as a touch screen, can collect touch operations on or near the screen (such as the user using a finger, a stylus, or the like on the touch panel 831 or near the touch panel 831) and drive the corresponding connection device according to a preset program. In one embodiment, the touch panel 831 can include two portions of a touch detection device and a touch controller. The touch detection device detects the touch orientation of the user, and detects a signal brought by the touch operation, and transmits the signal to the touch controller; the touch controller receives the touch information from the touch detection device, converts the touch information into contact coordinates, and sends the touch information. The processor 880 is provided and can receive commands from the processor 880 and execute them. In addition, the touch panel 831 can be implemented in various types such as resistive, capacitive, infrared, and surface acoustic waves. In addition to the touch panel 831, the input unit 830 may also include other input devices 832. In particular, other input devices 832 may include, but are not limited to, one or more physical keyboards, function keys (such as volume control buttons, switch buttons, etc.).

The display unit 840 can be used to display information input by the user or information provided to the user as well as various menus of the mobile phone. The display unit 840 can include a display panel 841. In one embodiment, the display panel 841 can be configured in the form of a liquid crystal display (LCD), an organic light-emitting diode (OLED), or the like. In one embodiment, the touch panel 831 can cover the display panel 841. When the touch panel 831 detects a touch operation thereon or nearby, the touch panel 831 transmits to the processor 880 to determine the type of the touch event, and then the processor 880 is the type of touch event provides a corresponding visual output on display panel 841. Although the touch panel 831 and the display panel 841 are used as two independent components to implement the input and input functions of the mobile phone in FIG. 7, in some embodiments, the touch panel 831 can be integrated with the display panel 841 to realize the input and output functions of the phone.

The mobile phone 800 can also include at least one type of sensor 850, such as a light sensor, motion sensor, and other sensors. Specifically, the light sensor may include an ambient light sensor and a proximity sensor, wherein the ambient light sensor may adjust the brightness of the display panel 841 according to the brightness of the ambient light, and the proximity sensor may close the display panel 841 and/or backlight when the mobile phone moves to the ear. The motion sensor may include an acceleration sensor, and the acceleration sensor can detect the magnitude of the acceleration in each direction, and the magnitude and direction of the gravity can be detected at rest, and can be used to identify the gesture of the mobile phone (such as horizontal and vertical screen switching), and vibration recognition related functions (such as Pedometer, tapping, etc.; in addition, the mobile phone can also be equipped with gyroscopes, barometers, hygrometers, thermometers, infrared sensors and other sensors.

The audio circuitry 860, speaker 861, and microphone 862 can provide an audio interface between the user and the handset. The audio circuit 860 can transmit the converted electrical data of the received audio data to the speaker 861 for conversion to the sound signal output by the speaker 861; on the other hand, the microphone 862 converts the collected sound signal into an electrical signal by the audio circuit 860. After receiving, it is converted into audio data, and then processed by the audio data output processor 880 to another mobile phone via the RF circuit 810 or outputted to the memory 820 for subsequent processing.

Wi-Fi is a short-range wireless transmission technology. The mobile phone can help users to send and receive e-mail, browse web pages and access streaming media through the Wi-Fi module 870, which provides users with wireless broadband internet access. Although FIG. 7 shows the Wi-Fi module 870, it can be understood that it does not belong to the essential configuration of the mobile phone 800 and can be omitted as needed.

The processor 880 is the control center of the mobile phone, and connects various portions of the entire handset using various interfaces and lines, by executing or executing software programs and/or modules stored in the memory 820, and invoking data stored in the memory 820, executing the phone's various functions and processing data, so that the overall monitoring of the phone. In one embodiment, processor 880 can include one or more processing units. In one embodiment, the processor 880 can integrate an application processor and a modem processor, wherein the application processor primarily processes an operating system, a user interface, an application, etc.; the modem processor primarily processes wireless communications. It will be appreciated that the above described modem processor may also not be integrated into the processor 880.

The mobile phone 800 also includes a power source 890 (such as a battery) that supplies power to various components. Preferably, the power source can be logically coupled to the processor 880 through a power management system to manage functions such as charging, discharging, and power management through the power management system.

In one embodiment, the mobile phone 800 can also include a camera, a Bluetooth module, and the like.

In the embodiment of the present disclosure, the computer device includes the processor 880, the processor and a computer program stored on the memory and operable on the processor, and the processor performs the above switching in the split screen mode when the program is executed the various steps in the applied method.

The embodiment of the present disclosure also provides a computer readable storage medium. A computer readable storage medium having stored thereon a computer program that, when executed by a processor, implements the steps in the method of switching applications in the split screen mode.

The embodiment of the present disclosure receives the target display area selected by the outside world and the target application selected by the outside world, so that the user has the right to select the target display area and the target application, so that the user can split the screen in the selected split screen area according to his own needs. The application displayed in the area is switched to other applications specified by the user, so that the switching of the application in the split screen mode is more convenient and closer to the needs of the user.

One of ordinary skill in the art can understand that all or part of the process of implementing the above embodiments can be completed by a computer program to instruct related hardware, and the program can be stored in a non-volatile computer readable storage medium. Wherein, the program, when executed, may include the flow of an embodiment of the methods as described above. The storage medium may be a magnetic disk, an optical disk, a read-only memory (ROM), or the like.

The above-mentioned embodiments are merely illustrative of several embodiments of the present invention, and the description thereof is more specific and detailed, but is not to be construed as limiting the scope of the invention. It should be noted that a number of variations and modifications may be made by those skilled in the art without departing from the scope of the present invention. Therefore, the protection scope of the present invention should be determined by the appended claims.

What is claimed is:

1. A method for switching applications in a split screen mode of a terminal screen, comprising:
    receiving a first selection instruction when the split screen mode of the terminal screen is activated by showing a plurality of display areas, the first selection instruction being configured to select a target display area from the plurality of display areas;
    displaying one or more applications to be switched in the target display area in response to a receiving of a switching instruction of applications;
    receiving a second selection instruction, the second selection instruction being configured to select a target application from the one or more applications to be switched; and
    displaying a running interface of the target application instead of an application displayed in the target display area when the target application supporting the split screen mode; otherwise, exiting the split screen mode and displaying the target application in a full screen mode.

2. The method of claim 1, wherein displaying one or more applications to be switched in the target display area comprises:
    displaying at least one of an icon, a name, and a running interface of each of one or more applications supporting the split screen mode in the target display area, the one or more applications supporting the split screen mode being pre-stored, and the second selection instruction is configured to select a target application among the one or more applications supporting the split screen mode.

3. The method of claim 2, further comprising:
when the one or more applications supporting the split screen mode comprises a plurality of applications running in the background, obtaining a latest time being visited of each of the applications running in the background;
sorting the plurality of applications running in the background in an order of the latest time from the most recent to the earliest, to obtain a first order; and
displaying the at least one of the icons, the name, and the running interface of the plurality applications running in the background in the target display area, according to the first order.

4. The method of claim 3, further comprising:
when the one or more applications supporting the split screen mode comprises one inactive application, arranging the inactive application to be displayed after the plurality of applications running in the background of the first order;
when the one or more applications supporting the split screen mode comprises a plurality of inactive applications, obtaining a number of times that each of the plurality of inactive applications being visited within a given period of time;
sorting the plurality of inactive applications in a descending order of the number of the times to obtain a second order; and
arranging the plurality of the inactive applications of the second order to be displayed after the plurality of applications background running of the first order.

5. The method of claim 1, wherein displaying one or more applications to be switched in the target display area comprises:
displaying at least one of an icon, a name, and a running interface of one or more applications in a list of recently used applications in the target display area;
the second selection instruction is configured to select the target application among the one or more applications in the list of recently used applications;
displaying a running interface of the target application in the target display area comprises:
when the target application is an application supporting the split screen mode, displaying a running interface of the target application instead of an application displayed in the target display area, otherwise, exiting the split screen mode, and displaying the target application in a full screen mode.

6. The method of claim 1, before receiving a first selection instruction, further comprising:
receiving a split screen mode instruction to enter the split screen mode, and displaying a current application in a first display area;
the first selection instruction being configured to select a second display area to be the target display area.

7. The method of claim 1, further comprising:
receiving an instruction applied on a Home button while the terminal screen is in the split screen mode, exiting the split screen mode and displaying a desktop of the terminal screen.

8. The method of claim 1, further comprising:
when the terminal screen displays a desktop, selecting the target application in each of the plurality of display areas, respectively.

9. The method of claim 1, wherein the switching instruction of applications comprises at least one of a single click, a double click, and a long press in the target display area.

10. A computer device, comprising a terminal screen, a memory, a processor, and a computer program stored therein and executable on the processor, the processor executing the program to implement a method comprising the steps of:
receiving a first selection instruction to select a target display area for displaying another application different from a current application;
displaying one or more applications to be switched in the target display area in response to a receiving of a switching instruction of applications;
receiving a second selection instruction, the second selection instruction being configured to select a target application from the one or more applications to be switched; and
displaying a running interface of the target application instead of an application displayed in the target display area and remaining displaying the current application when the target application is an application supporting the split screen mode; otherwise, exiting the split screen mode and displaying the target application in a full screen mode.

11. The computer device of claim 10, wherein displaying one or more applications to be switched in the target display area executed by the processor comprises:
displaying at least one of an icon, a name, and a running interface of each of one or more applications supporting the split screen mode in the target display area, the one or more applications supporting the split screen mode being pre-stored, and
the second selection instruction is configured to select a target application among the one or more applications supporting the split screen mode.

12. The computer device of claim 11, wherein the processor further executes:
when the one or more applications supporting the split screen mode comprises a plurality of applications running in the background, obtaining a latest time being visited of each of the applications running in the background;
sorting the plurality of applications running in the background in an order of the latest time from the most recent to the earliest, to obtain a first order; and
displaying the at least one of the icons, the name, and the running interface of the plurality of background running applications in the target display area, according to the first order.

13. The computer device of claim 12, wherein the processor further executes:
when the one or more applications supporting the split screen mode comprises one inactive application, arranging the inactive application to be displayed after the plurality of applications running in the background of the first order;
when the one or more applications supporting the split screen mode comprises a plurality of inactive applications, obtaining a number of times that each of the plurality of inactive applications being visited within a given period of time;
sorting the plurality of inactive applications in a descending order of the number of the times to obtain a second order; and
arranging the plurality of the inactive applications of the second order to be displayed after the plurality of applications background running of the first order.

14. The computer device of claim 10, wherein displaying one or more applications to be switched in the target display area executed by the processor comprises:
- displaying at least one of an icon, a name, and a running interface of one or more applications in a list of recently used applications in the target display area;
- the second selection instruction is configured to select the target application among the one or more applications in the list of recently used applications;
- displaying a running interface of the target application in the target display area comprises:
- when the target application is an application supporting the split screen mode, displaying a running interface of the target application instead of an application displayed in the target display area, otherwise, exiting the split screen mode, and displaying the target application in a full screen mode.

15. The computer device of claim 10, before receiving a first selection instruction, the processor further executes:
- receiving a split screen mode instruction to enter the split screen mode, and displaying the current application in a first display area;
- the first selection instruction being configured to select a second display area to be the target display area.

16. A method for switching applications in a split screen mode of a terminal screen, comprising:
- receiving a first selection instruction when the split screen mode of the terminal screen is activated by showing a plurality of display areas, the first selection instruction being configured to select a target display area from the plurality of display areas;
- displaying at least one of an icon, a name, and a running interface of one or more applications in a list of recently used applications in the target display area;
- receiving a second selection instruction, the second selection instruction being configured to select a target application from the one or more applications to be switched, the second selection instruction is configured to select the target application among the one or more applications in the list of recently used applications; and
- switching to the target application from an application displayed in the target display area when the target application is an application supporting the split screen mode, otherwise, exiting the split screen mode, and displaying the target application in a full screen mode.

17. The method of claim 16, wherein displaying one or more applications to be switched in the target display area comprises:
- displaying at least one of an icon, a name, and a running interface of each of one or more applications supporting the split screen mode in the target display area, the one or more applications supporting the split screen mode being pre-stored, and
- the second selection instruction is configured to select a target application among the one or more applications supporting the split screen mode.

18. The method of claim 17, further comprising:
- when the one or more applications supporting the split screen mode comprises a plurality of applications running in the background, obtaining a latest time being visited of each of the applications running in the background;
- sorting the plurality of applications running in the background in an order of the latest time from the most recent to the earliest, to obtain a first order; and
- displaying the at least one of the icons, the name, and the running interface of the plurality applications running in the background in the target display area, according to the first order.

19. The method of claim 18, further comprising:
- when the one or more applications supporting the split screen mode comprises one inactive application, arranging the inactive application to be displayed after the plurality of applications running in the background of the first order;
- when the one or more applications supporting the split screen mode comprises a plurality of inactive applications, obtaining a number of times that each of the plurality of inactive applications being visited within a given period of time;
- sorting the plurality of inactive applications in a descending order of the number of the times to obtain a second order; and
- arranging the plurality of the inactive applications of the second order to be displayed after the plurality of applications background running of the first order.

20. The method of claim 16, before receiving a first selection instruction, further comprising:
- receiving a split screen mode instruction to enter the split screen mode, and displaying a current application in a first display area;
- the first selection instruction being configured to select a second display area to be the target display area.

* * * * *